(12) United States Patent
Sobania

(10) Patent No.: US 9,912,548 B2
(45) Date of Patent: Mar. 6, 2018

(54) ENHANCED TRACING AND/OR MONITORING OF THE NETWORK NODES OF A COMMUNICATION NETWORK

(71) Applicant: Deutsche Telekom AG, Bonn (DE)

(72) Inventor: Alexander Sobania, Sankt Augustin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/431,810

(22) Filed: Feb. 14, 2017

(65) Prior Publication Data

US 2017/0237629 A1    Aug. 17, 2017

(30) Foreign Application Priority Data

Feb. 16, 2016    (EP) ..................................... 16155815

(51) Int. Cl.
| | |
|---|---|
| *H04L 12/26* | (2006.01) |
| *H04L 12/24* | (2006.01) |
| *H04W 24/06* | (2009.01) |
| *H04W 24/08* | (2009.01) |

(52) U.S. Cl.
CPC ............ *H04L 41/145* (2013.01); *H04L 41/12* (2013.01); *H04L 41/5038* (2013.01); *H04L 43/04* (2013.01); *H04L 43/10* (2013.01); *H04L 43/12* (2013.01); *H04L 43/14* (2013.01); *H04W 24/06* (2013.01); *H04W 24/08* (2013.01)

(58) Field of Classification Search
CPC ... H04L 41/145; H04L 41/5038; H04L 41/12; H04L 43/10; H04W 24/06; H04W 24/08
See application file for complete search history.

(56) References Cited

U.S. PATENT DOCUMENTS

| | | | | |
|---|---|---|---|---|
| 2013/0332602 | A1* | 12/2013 | Nakil ................... | G06N 99/005 709/224 |
| 2015/0103679 | A1* | 4/2015 | Tessmer .............. | H04L 43/0811 370/252 |

FOREIGN PATENT DOCUMENTS

WO    2015024838 A1    2/2015

OTHER PUBLICATIONS

Messina Fabrizio et al: "An Agent Based Architecture for VM Software Tracking in Cloud Federations", 2014 Eighth International Conference on Complex, Intelligent and Software Intensive Systems, IEEE, Jul. 2, 2014 (Jul. 2, 2014), pp. 463-468, XP032653619.

(Continued)

*Primary Examiner* — Afshawn Towfighi

(74) *Attorney, Agent, or Firm* — Leydig, Voit & Mayer, Ltd.

(57) ABSTRACT

A method for enhanced tracing and/or monitoring of network nodes of a communication network includes tracing or capturing, by at least one tracing functionality agent corresponding to at least one virtual machine, first data packets being sent by at least one virtual machine and/or second data packets being received by the at least one virtual machine; and transmitting, by the at least one tracing functionality agent corresponding to the at least one virtual machine, the first data packets and/or the second data packets to a monitoring entity or to a data layer of the communication network.

11 Claims, 2 Drawing Sheets

(56) References Cited

OTHER PUBLICATIONS

Spirent Communications: "Draft—DGS/NFV-REL004 v0.2.0 (GS NFV-REL 004) Active Monitoring and Failure Detection in NFV Environments", ETSI Draft; NFV (16)000036, European Telecommunications Standards Institute (ETSI), 650, Route Des Lucioules; F-06921 Sophia-Antipolis; France, vol. NFV Network Functions Virtualization, No. 2 0 Jan. 15, 2016 (Jan. 15, 2016), pp. 1-69, XP014265125.

* cited by examiner

ENHANCED TRACING AND/OR MONITORING OF THE NETWORK NODES OF A COMMUNICATION NETWORK

CROSS-REFERENCE TO RELATED APPLICATIONS

Priority is claimed to European Patent Application No. EP 16155815.0, filed on Feb. 16, 2016, the entire disclosure of which is hereby incorporated by reference herein.

FIELD

The present invention relates to a method for enhanced tracing and/or monitoring of the network nodes of a communication network, wherein the communication network comprises a plurality of virtual machines in a network architecture realizing network function virtualization of the communication network, wherein at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network.

Furthermore, the present invention relates to a communication network for enhanced tracing and/or monitoring of the network nodes of the communication network, wherein the communication network comprises a plurality of virtual machines in a network architecture realizing network function virtualization of the communication network, wherein the communication network is configured such that at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network.

Furthermore, the present invention relates to a plurality of virtual machines for enhanced tracing and/or monitoring of the network nodes of a communication network, wherein the communication network comprises the plurality of virtual machines in a network architecture realizing network function virtualization of the communication network, wherein the communication network is configured such that at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network.

Furthermore, the present invention relates to a virtualized network function manager functionality for enhanced tracing and/or monitoring of the network nodes of a communication network, wherein the communication network comprises a plurality of virtual machines in a network architecture realizing network function virtualization of the communication network, wherein the virtualized network function manager functionality is configured such that at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network.

Another aspect of the present invention relates to a program and to a computer program product for enhanced tracing and/or monitoring of the network nodes of a communication network.

BACKGROUND

Network management is a big challenge in large-scale enterprise and data center environments. The network must operate reliably and provide high-performance connectivity while ensuring organizational policy management. This situation might be further compounded by provisioning high-level guarantees such as network isolation across complex network boundaries and decoupling logical and physical network using network virtualization schemes.

In traditional communication networks such as telecommunication networks like 2G, 3G and 4G mobile communication networks (i.e. second/third/fourth generation mobile communication networks), it is, hence, important to trace or capture data packets which are being exchanged on all kinds of interfaces. This is typically not only required for troubleshooting purposes but also for quality and performance monitoring.

In order to avoid any kind of dependencies and active manipulation of the traffic, a common approach is to mirror all the traffic on the interface to be captured with hardware, especially dedicated hardware. In this manner, network taps are able to copy the traffic between different points (or interfaces) within the communication network, and forward such traffic to hardware probes or other network nodes that eventually do the analysis of the captured traffic.

The concept based on network taps and probes typically requires a huge invest in hardware and is difficult to maintain since changes in the network generally require adaptation of the physical cabling and additional configuration changes for conducting the tracing. Hence, such a solution is predominantly applicable to a more or less static communication network, and hence, using such a configuration of a communication network, it is difficult to dynamically scale or grow such a communication network.

Traditionally, vendors of hardware probes are tightly coupling their software to the hardware and in many cases the software is use case specific. This leads to situations where several hardware probes need to be placed on one and the same interface (or physical node) in order to be able to tap or trace different kinds of information or use cases.

In addition, new concepts like Network Function Virtualization (NFV) and Software Defined Networks (SDN) are changing the way communication networks are built. The main benefits are the decoupling of the telecommunication software from the hardware through virtualization and a high degree of dynamic automation. However, these benefits constitute huge challenges for the traditional network tracing approach since several network points (or network nodes) might be running on one and the same physical hardware (or server entity) and, hence, traffic between such network points (or network nodes) is not leaving the physical hardware (or server entity) anymore. As a consequence, such traffic cannot be traced or mirrored via taps and forwarded to the probes.

Additionally, also the automation of such software defined networks, especially implementing network function virtualization, i.e. implying dynamic scaling and auto healing if failures of network nodes occur, renders the configuration of traditional probes almost impossible since the (virtualized) network nodes might move from one physical hardware (or server entity) to another one within minutes and even the number of such (virtualized) network nodes might scale according to the load within the communication network, either within the same physical hardware (or server entity) or even to several data centers (typically comprising a plurality of physical computer nodes). As a consequence, it is not possible to follow such a dynamic reconfiguration of the network nodes of the communication network by physically changing the cabling and/or the probe configuration.

SUMMARY

In an exemplary embodiment, the invention provides a method for enhanced tracing and/or monitoring of network nodes of a communication network. The communication network comprises a plurality of virtual machines in a network architecture realizing network function virtualization of the communication network. At least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network. The virtual machines of the plurality of virtual machines are instantiated and/or generated and/or controlled and/or moved and/or removed by a virtualized network function manager functionality of the communication network. The communication network comprises at least one tracing functionality agent, the at least one tracing functionality agent being a virtualized tracing functionality agent and being integrated in the at least one virtual machine of the plurality of virtual machines such that the at least one tracing functionality agent is a tracing functionality agent corresponding to the at least one virtual machine. The method includes: tracing or capturing, by the at least one tracing functionality agent corresponding to the at least one virtual machine, the first data packets being sent by the at least one virtual machine and/or the second data packets being received by the at least one virtual machine; and transmitting, by the at least one tracing functionality agent corresponding to the at least one virtual machine, the first data packets and/or the second data packets to a monitoring entity or to a data layer of the communication network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
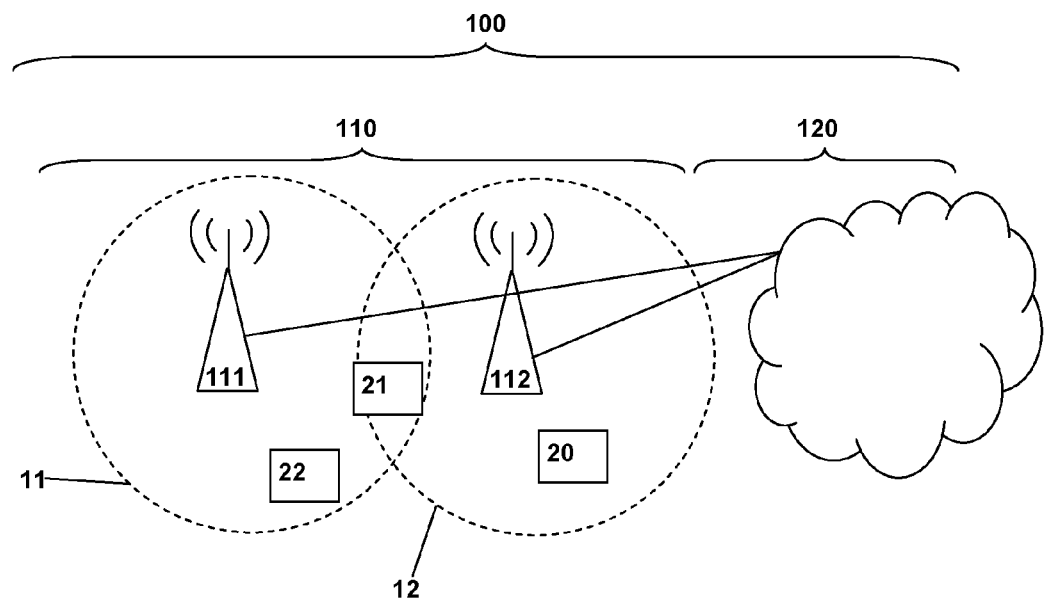
FIG. 1 schematically illustrates a mobile telecommunications network for enhanced tracing and/or monitoring of the network nodes of a communication network according to an exemplary embodiment.

Exemplary embodiments of the present invention provide a method for enhanced tracing and/or monitoring of the network nodes of a communication network comprising a plurality of virtual machines in a network architecture realizing network function virtualization such that it is possible to realize greater flexibility, higher reliability and reduced maintenance regarding tracing, especially regarding tracing functionality being more dynamic and independent from the infrastructure and the hardware of the communication network.

In an exemplary embodiment, the present invention provides a method for enhanced tracing and/or monitoring of the network nodes of a communication network, wherein the communication network comprises a plurality of virtual machines in a network architecture realizing network function virtualization of the communication network, wherein at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network, wherein the virtual machines of the plurality of virtual machines are instantiated and/or generated and/or controlled and/or moved and/or removed by a virtualized network function manager functionality of the communication network, wherein the communication network comprises at least one tracing functionality agent, the at least one tracing functionality agent being a virtualized tracing functionality agent and being integrated in the at least one virtual machine of the plurality of virtual machines such that the at least one tracing functionality agent is a tracing functionality agent corresponding to the at least one virtual machine, and traces or captures the first data packets being sent by the at least one virtual machine and/or the second data packets being received by the at least one virtual machine, wherein the corresponding tracing functionality agent transmits the first data packets and/or the second data packets to a monitoring entity or to a data layer of the communication network.

It is thereby advantageously possible according to the present invention that the tracing of communication flows is independent of the infrastructure and the hardware implementation of the communication network. By implementing the communication network such that at least one, but preferably a plurality virtual machines in the communication network comprises (or preferably comprise) a tracing functionality agent that is a virtualized tracing functionality agent which is integrated in the at least one virtual machine (but preferably integrated within each of the plurality of virtual machines), it is advantageously possible according to the present invention to trace or capture data packets being sent by the virtual machine (or the plurality of virtual machines)—first data packets with respect to the considered virtual machine) and/or to trace and capture data packets being received by the virtual machine (or the plurality of virtual machines)—second data packets with respect to the considered virtual machine). Hence, by integrating the tracing functionality agent (or even a plurality of tracing functionality agents) within the virtual machine (or within each of the plurality of virtual machines), it is advantageously possible to realize a tracing functionality which is independent from the infrastructure and the hardware hosting the respective virtual machine, i.e. for the tracing functionality agent, it does not matter on which server entity (or physical computer node) the virtual machine is actually running.

Additionally, it is advantageously possible to limit the implementation of the tracing functionality, e.g., per tenant or per network slice or per (radio access) technology. For example, it is advantageously possible to implement tracing agents only in virtual machines realizing network functionalities of a 2G mobile communication network (i.e. for a second generation mobile network, for example in order to be compliant with security requirements) (and, e.g., not in virtual machines realizing network functionalities of a 3G or 4G mobile communication network (third or fourth generation mobile network)). Of course, an application vice versa is easily possible as well (i.e. the implementation of the tracing functionality agents only for network nodes of, e.g., 3G mobile communication network.

According to the present invention, it is advantageously possible that no physical interactions are required for the implementation of the tracing functionality, and, hence, the maintenance of the communication network is by far less operation intense compared to hardware tracing agents.

A further advantage of the present invention refers to the possibility of being able to easily implement tracing (or monitoring of interfaces or points between different network nodes of the communication network) for different purposes or use cases. As vendors of hardware probes (to provide tracing functionality within a communication network) traditionally have the tendency of providing use case specific software, especially coupling their software to their hardware, the tracing of different kinds of information may, in conventional communication networks, require different approaches regarding tracing such different kinds of information (for different tracing use cases) up to using a plurality of hardware probes at one and the same interface for different use cases. In contrast, the present invention advantageously provides the possibility to reduce such efforts for implementing tracing functionality by using general purpose tracing functionality agents, i.e. typically software modules providing tracing functionality without specifically being directed to certain (tracing) use case, i.e. such general purpose tracing functionality agents are able to capture whatever traffic occurs at the corresponding interface (or to and/or from the corresponding virtual (or physical) machine), independent of the content of that traffic. According to the present invention, this provides the further advantage that tracing strategies can be easily applied to all points or interfaces within the communication network that are equipped with such general purpose tracing functionality agents, i.e. the tracing functionality can advantageously be provided independently from the specific application running on (or the specific network node functionality being provided by) a specific virtual (or physical) machine, and hence can be applied to the whole telecommunication network for all use cases.

According to the present invention it is preferred that the communication network comprises a plurality of tracing functionality agents being virtualized tracing functionality agents, each tracing functionality agent of the plurality of tracing functionality agents being integrated in a virtual machine of the plurality of virtual machines such that the plurality of tracing functionality agents, respectively, trace or capture corresponding data packets being sent or received, respectively, by the virtual machines of the plurality of virtual machines, wherein the plurality of tracing functionality agents, respectively, transmit the corresponding data packets to the monitoring entity or to the data layer of the communication network.

Thereby, it is advantageously possible that each virtual machine of a plurality of virtual machines comprises a tracing functionality agent, respectively, and that the corresponding tracing functionality agent—i.e. for each virtual machine of the plurality of virtual machines—traces or monitors first data packets that are sent by the virtual machine considered, and second data packets that are received by the virtual machine considered.

According to the present invention it is preferred that the tracing functionality agent corresponding to the at least one virtual machine is part of the at least one virtual machine, especially a part of the software package or image of the at least one virtual machine, especially in the form of a packet sniffer module and/or a copy operation module.

Thereby, it is advantageously possible to realize the tracing functionality agent in a very easy and reliable manner, especially independent from the location, i.e. the physical computer node that hosts that virtual machine, or the data center that comprises the physical computer node hosting that virtual machine.

According to the present invention it is preferred that the communication network comprises at least one data center, wherein the at least one data center comprises a plurality of first physical computer nodes, the plurality of first physical computer nodes especially comprising, respectively, processors and memories, wherein the plurality of first physical computer nodes act as host machines for at least a part of the plurality of virtual machines.

Thereby, it is advantageously possible to host a multitude of different virtual machines on a plurality of physical computer nodes (or first computer nodes), wherein the computer nodes are especially provided as standardized, multipurpose computer nodes, typically being provided with processors and memories being dedicated to each one of the computer nodes, and additional storage capacity that might be shared among a plurality of computer nodes.

According to a further preferred embodiment of the present invention, the communication network comprises, besides the data center, a further data center, wherein the further data center comprises a plurality of second physical computer nodes, the plurality of second physical computer nodes especially comprising, respectively, further processors and further memories, wherein the plurality of first and second physical computer nodes together act as host machines for the plurality of virtual machines.

Thereby, it is advantageously possible to host a multitude of different virtual machines (realizing the functionalities of the network nodes of the communication network) on a plurality of physical computer nodes such that load can be shared and/or distributed between different data centers, i.e. between the first computer nodes being located at the data center and the second computer nodes being located at the further data center, thereby avoiding the data center to constitute a single point of failure.

According to the present invention, it is preferred that in case of the virtual machine being instantiated and/or generated by the virtualized network function manager functionality—especially instantiated on a specific physical computer node of the first or second physical computer nodes—(that might also be called an orchestration node), the corresponding tracing functionality agent, is likewise instantiated and/or generated by the virtualized network function manager functionality, the corresponding tracing functionality agent especially being instantiated and/or generated on the same specific physical computer node of the first or second physical computer nodes that also hosts the virtual machine.

Thereby, it is advantageously possible to assure that the tracing functionality agent moves together with the respective virtual machine, i.e. also with the considered network node of the communication network, for which the tracing functionality is implemented.

According to the present invention it is preferred that in case of the virtual machine being moved and/or transferred, by the virtualized network function manager functionality, from a specific physical computer node of the first physical computer nodes to a further specific physical computer node of the first or second physical computer nodes, the corresponding tracing functionality agent, is likewise moved and/or transferred, by the virtualized network function manager functionality, from the specific physical computer node to the further specific physical computer node.

According to the present invention it is preferred that the communication network is a mobile communication network, and wherein the plurality of virtual machines realize or are associated with the network node functionality of at least one of the following:
one or a plurality of mobility management entity node(s),
one or a plurality of serving gateway node(s),
one or a plurality of packet gateway node(s)
one or a plurality of network layers of the mobile communication network, especially related to different radio access technologies.

According to the present invention it is preferred that the communication network comprises—besides the plurality of virtual machines—a plurality of physical machines being distinct from the first and second physical computer nodes, wherein at least one physical machine of the plurality of physical machines realizes or is associated with at least one network node functionality of the communication network via sending first data packets to and/or receiving second data packets from other virtual or physical machines of the communication network or via sending first data packets to and/or receiving second data packets from network nodes within or outside of the communication network, wherein at least one additional tracing functionality agent—being part of or running on the at least one physical machine—traces or captures the first data packets being sent by the at least one physical machine and/or the second data packets being received by the at least one physical machine,
wherein the additional tracing functionality agent transmits the first data packets and/or the second data packets to the monitoring entity or to the data layer of the communication network.

It is thereby advantageously possible to implement a hybrid communication network—comprising both virtual machines and physical. The tracing functionality agents corresponding to the physical machines are also part of the physical machines as the tracing functionality agents corresponding to the virtual machines are part of the virtual machines, hence a global tracing concept both for physical machines and virtual machines is advantageously possible to be implemented.

Furthermore, the present invention relates to a communications network for enhanced tracing and/or monitoring of the network nodes of the communication network, wherein the communication network comprises a plurality of virtual machines in a network architecture realizing network function virtualization of the communication network, wherein the communication network is configured such that at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network, wherein the communication network is configured such that the virtual machines of the plurality of virtual machines are instantiated and/or generated and/or controlled and/or moved and/or removed by a virtualized network function manager functionality of the communication network,
wherein the communication network comprises at least one tracing functionality agent, the at least one tracing functionality agent being a virtualized tracing functionality agent and being integrated in the at least one virtual machine of the plurality of virtual machines such that the at least one tracing functionality agent is a tracing functionality agent corresponding to the at least one virtual machine, and wherein the communication network is configured such that the corresponding tracing functionality agent traces or captures the first data packets being sent by the at least one virtual machine and/or the second data packets being received by the at least one virtual machine,
wherein the communication network is further configured such that the corresponding tracing functionality agent transmits the first data packets and/or the second data packets to a monitoring entity or to a data layer of the communication network.

Thereby, it is advantageously possible according to the present invention to provide a communication network with a general purpose tracing functionality such that the tracing of communication flows is independent of the infrastructure and the hardware implementation of the communication network, i.e. for a tracing functionality agent corresponding to a virtual machine, it does not matter on which server entity (or physical computer node) the virtual machine is actually running.

Furthermore, the present invention relates to a plurality of virtual machines for enhanced tracing and/or monitoring of the network nodes of a communication network, wherein the communication network comprises the plurality of virtual machines in a network architecture realizing network function virtualization of the communication network, wherein the communication network is configured such that at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network, wherein the plurality of virtual machines is configured such that the virtual machines of the plurality of virtual machines are instantiated and/or generated and/or controlled and/or moved and/or removed by a virtualized network function manager functionality of the communication network, wherein the communication network comprises at least one tracing functionality agent, the at least one tracing functionality agent being a virtualized tracing functionality agent and being integrated in the at least one virtual machine of the plurality of virtual machines such that the at least one tracing functionality agent is a tracing functionality agent corresponding to the at least one virtual machine, and wherein the virtual machines are configured such that the corresponding tracing functionality agent traces or captures the first data packets being sent by the at least one virtual machine and/or the second data packets being received by the at least one virtual machine, wherein the virtual machines are further configured such that the corresponding tracing functionality agent transmits the first data packets and/or the second data packets to a monitoring entity or to a data layer of the communication network.

Thereby, it is advantageously possible according to the present invention to provide a plurality of virtual machines such that the tracing of communication flows is independent of the infrastructure and the hardware implementation hosting the virtual machines.

Additionally, the present invention relates to a virtualized network function manager functionality for enhanced tracing and/or monitoring of the network nodes of a communication network, wherein the communication network comprises a plurality of virtual machines in a network architecture realizing network function virtualization of the communication network, wherein the virtualized network function manager functionality is configured such that at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network, wherein the virtualized network function manager functionality is configured such that it instantiates and/or generates and/or controls and/or moves and/or removes the virtual machines of the plurality of virtual machines, wherein the communication network comprises at least one tracing functionality agent, the at least one tracing functionality agent being a virtualized tracing functionality agent and being integrated in the at least one virtual machine of the plurality of virtual machines such that the at least one tracing functionality agent is a tracing functionality agent corresponding to the at least one virtual machine, and wherein the virtualized network function manager functionality is configured such that the corresponding tracing functionality agent traces or captures the first data packets being sent by the at least one virtual machine and/or the second data packets being received by the at least one virtual machine, wherein the virtualized network function manager functionality is further configured such that the corresponding tracing functionality agent transmits the first data packets and/or the second data packets to a monitoring entity or to a data layer of the communication network.

Additionally, the present invention relates to a program comprising a computer readable program code which, when executed on a computer or on a physical computer node or on a virtual machine of a communication network causes the computer or the physical computer node or the virtual machine of the communication network to perform the method according to the present invention.

Still additionally, the present invention relates to a computer program product for enhanced tracing and/or monitoring of the network nodes of a communication network, the computer program product comprising a computer program stored on a storage medium, the computer program comprising program code which, when executed on a computer or on a physical computer node or on a virtual machine of a communication network causes the computer or the physical computer node or the virtual machine of the communication network to perform the method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a communication network 100 according to the present invention is schematically illustrated. According to the exemplary embodiment of FIG. 1, the communication network 100 is implemented as a mobile telecommunication network comprising a radio access network 110 and a core network 120. The radio access network 110 of the mobile communication network 100 comprises a plurality of radio cells of which a first radio cell 11 and a second radio cell 12 is exemplarily represented. The radio cells 11, 12 correspond to radio coverage areas of base station entities, typically NodeBs or eNodeBs, of which a first base station entity 111 and a second base station entity 112 is schematically represented in FIG. 1. The telecommunications network 100 is configured to provide communication services to a plurality of user equipments 20, 21, 22.

Especially the core network 120 of the telecommunications network 100 (or communication network 100)—but, at least in principle and/or at least in part also the access network 110 of the communication network 100—comprises a plurality of network nodes or network entities that are not necessarily represented in detail. The different network nodes or network entities are required for providing different network node functionalities such that the communication network 100 is able to provide the communication services to its users; in the case of a mobile communication network such communication services are typically requested by the user equipments 20, 21, 22.

For a mobile communication network in an exemplary embodiment, the following examples of network node functionalities could apply (especially for the cases of the mobile communication network being a Long-Term Evolution (LTE) or Universal Mobile Telecommunications System (UMTS) network):

- the network node functionalities of one or a plurality of mobility management entity node(s),
- the network node functionalities of one or a plurality of serving gateway node(s),
- the network node functionalities of one or a plurality of packet gateway node(s)
- the network node functionalities of one or a plurality of home subscriber server node(s)
- the network node functionalities of one or a plurality of packet data network node(s)
- the network node functionalities of one or a plurality of mobile switching center node(s)
- the network node functionalities of one or a plurality of visitor location register node(s)
- the network node functionalities of one or a plurality of serving General Packer Radio Service (GPRS) support node(s) (SGSN).

The present invention relates to any communication network comprising network nodes that can be virtualized. Accordingly, the mobile communication network shown in FIG. 1, especially its core network 120, only represents an example of a communication network according to the present invention. Other examples of a communication network in exemplary embodiments comprise a fixed line telecommunications network or another communication network comprising computer nodes.

Figure 2:
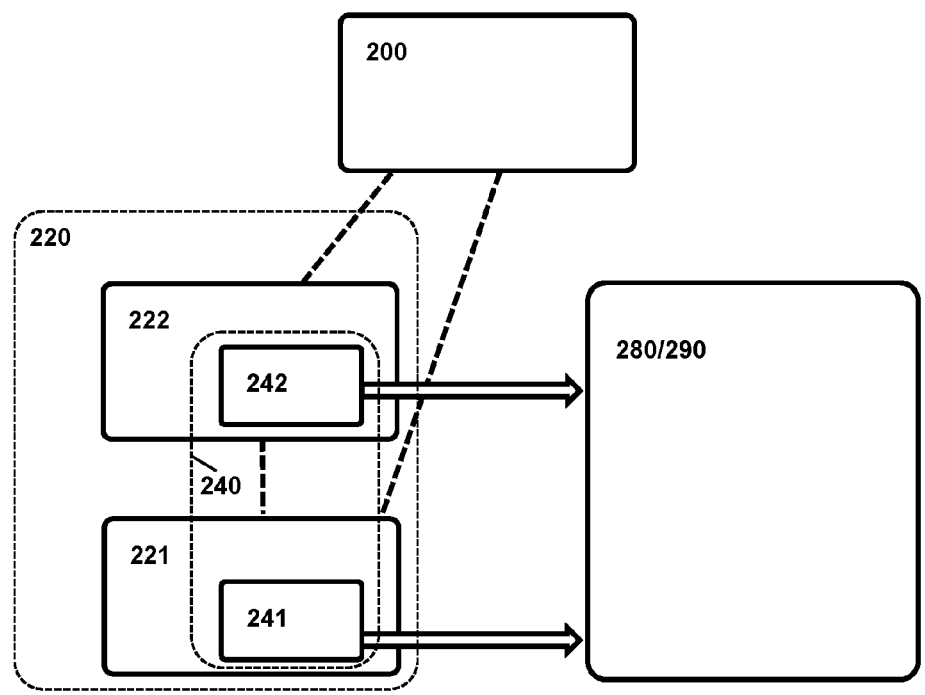
FIG. 2 schematically illustrates an overview of a plurality of virtual machines being orchestrated by a virtualized network function manager functionality, wherein tracing within the communication network is realized by each one of the virtual machines comprising a tracing functionality agent that provides tracing information to a monitoring entity or to a data layer of the communication network.

In FIG. 2, an overview of a plurality of virtual machines being orchestrated by a virtualized network function manager functionality is schematically shown. Tracing within the communication network 100 is realized by each one of the virtual machines comprising a tracing functionality agent that provides tracing information to a monitoring entity 280 or to a data layer 290 of the communication network 100.

Figure 3:
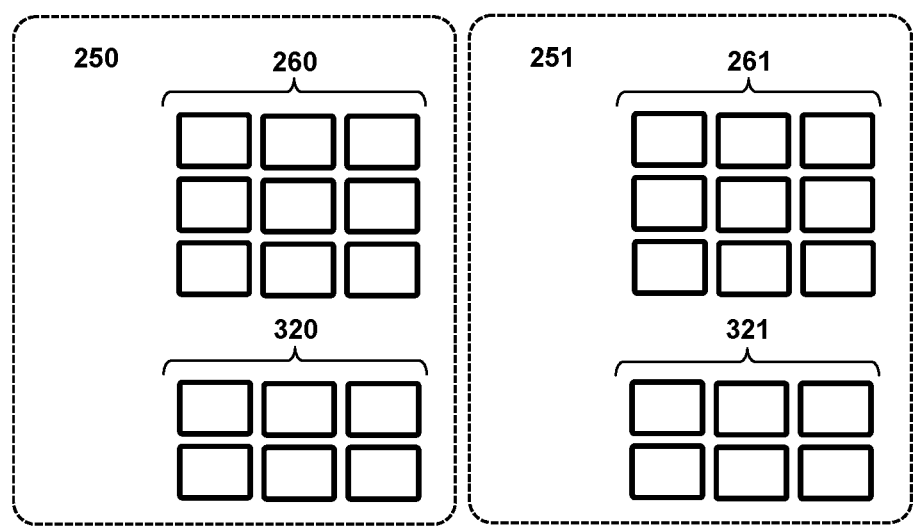
FIG. 3 schematically illustrates a data center and a further data center, the data center comprising a plurality of first physical computer nodes, the further data center comprising a plurality of second physical computer nodes, wherein the plurality of first and second physical computer nodes act as host machines for at least a part of the plurality of virtual machines of the communication network.

FIG. 3 schematically illustrates a data center 250 and a further data center 251, the data center 250 comprising a plurality of first physical computer nodes 260, the further data center 251 comprising a plurality of second physical computer nodes 261, wherein the plurality of first and second physical computer nodes 260, 261 act as host machines for at least a part of the plurality of virtual machines of the communication network 100.

According to the present invention, the communication network 100 comprises a plurality of virtual machines in a network architecture realizing network function virtualization of the communication network 100.

In FIG. 2, two such virtual machines are schematically indicated: A first virtual machine is indicated by reference sign 241, and a second virtual machine is indicated by reference sign 242. The plurality of virtual machines realized within the communication network 100 (typically comprising a number of virtual machines far exceeding two virtual machines, such as, e.g., 10 virtual machines, or 50 virtual machines, or 100 virtual machines, or 500 virtual machines) is also referred to by reference sign 220 (indicated by means of a dashed box in FIG. 2 comprising the first and second virtual machine 221, 222).

According to the present invention, at least one virtual machine of the plurality of virtual machines (in the following, the at least one virtual machine is often referred to by means of reference sign 221 of the first virtual machine; however, the at least one virtual machine could also be the second virtual machine 222) realizes or is associated with at least one network node functionality of the communication network 100. In order to realize this functionality, the considered virtual machine

- sends first data packets to other virtual machines of the plurality of virtual machines of the communication network 100 or to network nodes within or outside of the communication network 100, and/or
- receives second data packets from other virtual machines of the plurality of virtual machines of the communication network 100 or from network nodes within or outside of the communication network 100. Typically, also the other virtual machines (besides the at least one virtual machine) of the plurality of virtual machines send, respectively, data packets to other virtual machines of the plurality of virtual machines of the communication network 100 or to network nodes within or outside of the communication network 100, and/or receive data packets from other virtual machines of the plurality of virtual machines of the communication network 100 or from network nodes within or outside of the communication network 100.

Via at least one tracing functionality agent, it is possible—in an exemplary embodiment—to monitor and trace the traffic to and from the at least one virtual machine 221 (or 222), i.e. to monitor and trace the first data packets and the second data packets of the at least one virtual machine 221 (or 222). According to the present invention, a tracing functionality agent is always associated to a specific virtual machine, hence in FIG. 2 the first virtual machine 221 comprises a (first) tracing functionality agent 241, and the second virtual machine 222 comprises a (second) tracing functionality agent 242, i.e. the at least one tracing functionality agent 241, 242 is integrated in the at least one virtual machine 221, 222 of the plurality of virtual machines 220 such that the at least one tracing functionality agent 241, 242 is a tracing functionality agent corresponding to the at least one virtual machine 221, 222. The plurality of tracing functionality agents realized within the communication network 100 (typically comprising at least one tracing functionality agent per virtual machine) is also referred to by reference sign 240 (indicated by means of a dashed box in FIG. 2 comprising the first and second tracing functionality agent 241, 242).

According to the present invention, the tracing functionality agents 241, 242 are virtualized tracing functionality agents, tracing or capturing the (respective) first data packets being sent by the at least one virtual machine 221, 222 and/or the (respective) second data packets being received by the at least one virtual machine 221, 222. This means that the first tracing functionality agent 241 traces or captures the first data packets with respect to the first virtual machine 221 (i.e. the data packets being sent by the first virtual machine 221) and/or the second data packets with respect to the first virtual machine 221 (i.e. the data packets being received by the first virtual machine 221), and that the second tracing functionality agent 242 traces or captures the first data packets with respect to the second virtual machine 222 (i.e. the data packets being sent by the second virtual machine 222) and/or the second data packets with respect to the second virtual machine 222 (i.e. the data packets being received by the second virtual machine 222). The data packets traced or captured by the plurality of tracing functionality agents 240 are transmitted to a monitoring entity 280 or to a data layer 290 of the communication network 100, thereby forwarding the traffic of the respective virtual machines 221, 222 to the destination entity (i.e. a (preferably centralized) monitoring entity 280 or a data layer 290), especially for analysis purposes.

According to the present invention, a (centralized) monitoring entity 280 could preferably be used for a specific use case (of a tracing or monitoring need), especially with dedicated analysis software. In this case, it is preferred according to the present invention that several virtual machines send their tracing information (i.e. their first and second data packets) to the centralized monitoring server 280 or monitoring entity 280 where the captured data are merged and can be analyzed for the specific use case. Alternatively or cumulatively to using a monitoring entity 280, and especially in case the tracing information can be used for several use cases, the tracing information (i.e. the first and second data packets captured from the respective virtual machines 221, 222) can be fed into a (typically comparably big) data layer 290 where it is able to be correlated with other information and analyzed afterwards by an additional analyzing layer.

According to the present invention, the plurality of virtual machines 220 are instantiated and/or generated and/or controlled and/or moved and/or removed by a virtualized network function manager functionality 200 of the communication network 100, the virtualized network function manager functionality 200 acting as an orchestrator to the different virtual machines 220, i.e. it is especially used to deploy, scale and heal virtual machines 220 within the communication network, and especially on different data centers. According to the present invention, the virtualized network function manager functionality 200 typically instantiates or generates a virtual machine 221, 222 via installing a software configuration (or software packages) within a virtual machine or via loading (or copying) an image (or images of a virtual machine) of a software configuration (or of software packages) or of a virtual machine to a physical computer node (not represented in FIG. 2) acting as a host machine to the virtual machine to be generated or instantiated.

According to the present invention, also the tracing functionality agent 241, 242 corresponding to that virtual machine is deployed in the respective virtual machine 221, 222, i.e. as part of the software configuration of the respective virtual machine. According to the present invention, this provides the advantage that in cases that the virtual machine is moved or scaled (e.g. moved to another physical computer node, either being located in the same data center or even in another data center), the entity responsible for such a relocation or transfer of a virtual machine, i.e. the orchestration functionality or virtualized network function manager functionality 200, ensures that the tracing functionality agents 241, 242 are redeployed and moved in the same manner as the corresponding virtual machine 221, 222, i.e. the first tracing functionality agent 241 moves (or is transferred or relocated or removed or deleted) with the first virtual machine 221, and the second tracing functionality agent 242 moves (or is transferred or relocated or removed or deleted) with the second virtual machine 222. This exemplary embodiment provides the possibility of avoiding additional hardware invest (for providing hardware probes) and enables a high degree of automation (i.e. reduces maintenance costs), especially in case of a modification of the communication network 100.

As schematically shown in FIG. 3, according to a preferred embodiment of the present invention, the communication network 100 comprises at least one data center 250, comprising a plurality of first physical computer nodes 260. Typically, such first physical computer nodes 260 comprise, respectively, processors and memories, and act as host machines for at least a part of the plurality of virtual machines 220. Furthermore, it is preferred according to the present invention that the communication network 100 comprises, besides the data center 250, a further data center 251, comprising a plurality of second physical computer nodes 261. Likewise, the second physical computer nodes 261 comprise, respectively, further processors and further memories. Preferably according to the present invention, in case of two data centers 250, 251, the first and second physical computer nodes 260, 261 together act as host machines for the plurality of virtual machines 220 of the communication network 100, i.e. the virtualized network function manager functionality 200 (not depicted in FIG. 3) is able to generate or instantiate a virtual machine (and especially any virtual machine of the plurality of virtual machines 220) such as the first or second virtual machine 221, 222 on any physical computer node (within any data center, i.e. either on a physical computer node of the first physical computer nodes 260 or on a physical computer node of the second physical computer nodes 261), and/or the virtualized network function manager functionality 200 is able to move or to relocate a virtual machine (and especially any virtual machine of the plurality of virtual machines 220) such as the first or second virtual machine 221, 222 from one physical computer node (e.g. within the data center 250) to another physical computer node (this other physical computer node being either located within also the data center 250 (i.e. a transfer among the first physical computer nodes 260) or being located within the further data center 251 (i.e. a transfer from a physical computer node of the first physical computer nodes 260 to a physical computer node of the second physical computer nodes 261).

Hence according to the present invention, it is advantageously possible to provide a tracing functionality that is much more dynamic and is applicable for being used with network architectures using network function virtualization and software defined networks.

Especially by forwarding the captures traffic (of the virtual machines 221, 222) to a centralized data layer 290, it is advantageously possible according to the present invention that the current data silos can be overcome and the data from different areas are used to discover new use cases of, e.g., network optimization.

It is especially advantageous according to the present invention to use, as tracing functionality agents 241, 242, relatively simple software modules like, for example, "tcpdump", a Linux packet-sniffer, e.g. in combination with a tool to forward the traffic to the centralized monitoring server 280 or big data layer 290, such as "secure copy".

According to the present invention, it is also preferred that the communication network 100 comprises—besides the plurality of virtual machines 220—a plurality of physical machines 320, 321 that are distinct from the first and second physical computer nodes 260, 261 (used for hosting the virtual machines 220). It is thereby advantageously possible to use such physical machines 320, 321 to realize one network node functionality or a plurality of network node functionalities of the communication network 100. In a manner analogous to the virtual machines 220, also the physical machines 320, 321 are, respectively, sending first data packets to other virtual or physical machines of the communication network 100 or to network nodes within or outside of the communication network 100 and/or receiving second data packets from other virtual or physical machines of the communication network 100 or from network nodes within or outside of the communication network 100. Again in a manner analogous to the virtual machines 220, also the physical machines 320, 321, respectively, comprise additional tracing functionality agents (not depicted in FIG. 3), the additional tracing functionality agents being part of or running on the physical machines 320, 321 and trace or capture the first data packets being sent by the physical machines 320, 321 and/or the second data packets being received by the physical machine 320, 321. Also the additional tracing functionality agents transmit the first data packets and/or the second data packets to the monitoring entity 280 or to the data layer 290 of the communication network 100.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced tracing and/or monitoring of network nodes of a communication network, wherein the communication network comprises a plurality of virtual machines in a network architecture realizing network function virtualization of the communication network, wherein at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network, wherein the virtual machines of the plurality of virtual machines are instantiated and/or generated and/or controlled and/or moved and/or removed by a virtualized network function manager functionality of the communication network, wherein the communication network comprises at least one tracing functionality agent, the at least one tracing functionality agent being a virtualized tracing functionality agent and being integrated in the at least one virtual machine of the plurality of virtual machines such that the at least one tracing functionality agent is a tracing functionality agent corresponding to the at least one virtual machine, the method comprising:

capturing, by the at least one tracing functionality agent corresponding to the at least one virtual machine, the first data packets being sent by the at least one virtual machine and/or the second data packets being received by the at least one virtual machine, wherein the first data packets and/or the second data packets are data packets exchanged between virtual machines of the plurality of virtual machines as part of the at least one network node functionality; and transmitting, by the at least one tracing functionality agent corresponding to the at least one virtual machine, the first data packets and/or the second data packets to a monitoring entity or to a big data layer of the communication network.

2. The method according to claim 1, wherein the communication network comprises a plurality of tracing functionality agents being virtualized tracing functionality agents, each tracing functionality agent of the plurality of tracing functionality agents being integrated in a virtual machine of the plurality of virtual machines such that the plurality of tracing functionality agents, respectively, trace or capture corresponding data packets being sent or received by respective virtual machines of the plurality of virtual machines;

wherein the plurality of tracing functionality agents, respectively, transmit the corresponding data packets to the monitoring entity or to the data layer of the communication network.

3. The method according to claim 1, wherein the at least one tracing functionality agent corresponding to the at least one virtual machine is part of the at least one virtual machine, especially a part of a software package or image of the at least one virtual machine, and especially in the form of a packet sniffer module and/or a copy operation module.

4. The method according to claim 1, wherein the communication network comprises at least one data center, wherein the at least one data center comprises a plurality of first physical computer nodes, the plurality of first physical computer nodes comprising, respectively, processors and memories, wherein the plurality of first physical computer nodes act as host machines for at least a part of the plurality of virtual machines.

5. The method according to claim 4, wherein the communication network comprises, besides the at least one data center, a further data center, wherein the further data center comprises a plurality of second physical computer nodes, the plurality of second physical computer nodes comprising, respectively, further processors and further memories, wherein the plurality of first and second physical computer nodes together act as host machines for the plurality of virtual machines.

6. The method according to claim 1, wherein in case of a virtual machine being instantiated and/or generated by the virtualized network function manager functionality, a corresponding tracing functionality agent is likewise instantiated and/or generated by the virtualized network function manager functionality on a same specific physical computer node that hosts the virtual machine.

7. The method according to claim 1, wherein in case of a virtual machine being moved and/or transferred by the virtualized network function manager functionality from a specific physical computer node to a further specific physical computer node, a corresponding tracing functionality agent is likewise moved and/or transferred by the virtualized network function manager functionality from the specific physical computer node to the further specific physical computer node.

8. The method according to claim 1, wherein the communication network is a mobile communication network, and wherein the plurality of virtual machines realize or are associated with the network node functionality of at least one of the following:
- one or a plurality of mobility management entity node(s),
- one or a plurality of serving gateway node(s),
- one or a plurality of packet gateway node(s),
- one or a plurality of network layers of the mobile communication network related to different radio access technologies.

9. The method according to claim 5, wherein the communication network comprises—besides the plurality of virtual machines—a plurality of physical machines being distinct from the first and second physical computer nodes, wherein at least one physical machine of the plurality of physical machines realizes or is associated with at least one network node functionality of the communication network via sending first data packets to and/or receiving second data packets from other virtual or physical machines of the communication network or via sending first data packets to and/or receiving second data packets from network nodes within or outside of the communication network, wherein at least one additional tracing functionality agent—being part of or running on the at least one physical machine—traces or captures the first data packets being sent by the at least one physical machine and/or the second data packets being received by the at least one physical machine, and
wherein the additional tracing functionality agent transmits the first data packets and/or the second data packets to the monitoring entity or to the data layer of the communication network.

10. A communication network for enhanced tracing and/or monitoring of network nodes of the communication network, wherein the communication network comprises:
a plurality of virtual machines in a network architecture realizing network function virtualization of the communication network, wherein at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network;
a virtualized network function manager functionality, configured to instantiate and/or generate and/or control and/or move and/or remove virtual machines of the plurality of virtual machines; and
at least one tracing functionality agent, the at least one tracing functionality agent being a virtualized tracing functionality agent and being integrated in the at least one virtual machine of the plurality of virtual machines such that the at least one tracing functionality agent is a tracing functionality agent corresponding to the at least one virtual machine, wherein the at least one tracing functionality agent is configured to:
capture the first data packets being sent by the at least one virtual machine and/or the second data packets being received by the at least one virtual machine, wherein the first data packets and/or the second data packets are data packets exchanged between virtual machines of the plurality of virtual machines as part of the at least one network node functionality; and
transmit the first data packets and/or the second data packets to a monitoring entity or to a big data layer of the communication network.

11. A non-transitory, computer-readable medium having processor-executable instructions stored thereon for enhanced tracing and/or monitoring of network nodes of a communication network, wherein the communication network comprises a plurality of virtual machines in a network architecture realizing network function virtualization of the communication network, wherein at least one virtual machine of the plurality of virtual machines realizes or is associated with at least one network node functionality of the communication network via sending first data packets to and/or receiving second data packets from other virtual machines of the plurality of virtual machines of the communication network or via sending first data packets to and/or receiving second data packets from network nodes within or outside of the communication network, wherein the virtual machines of the plurality of virtual machines are instantiated and/or generated and/or controlled and/or moved and/or removed by a virtualized network function manager functionality of the communication network, wherein the communication network comprises at least one tracing functionality agent, the at least one tracing functionality agent being a virtualized tracing functionality agent and being integrated in the at least one virtual machine of the plurality of virtual machines such that the at least one tracing functionality agent is a tracing functionality agent corresponding to the at least one virtual machine, wherein the processor-executable instructions, when executed, facilitate the following:
tracing or capturing, by the at least one tracing functionality agent corresponding to the at least one virtual machine, the first data packets being sent by the at least one virtual machine and/or the second data packets being received by the at least one virtual machine, wherein the first data packets and/or the second data packets are data packets exchanged between virtual machines of the plurality of virtual machines as part of the at least one network node functionality; and
transmitting, by the at least one tracing functionality agent corresponding to the at least one virtual machine, the first data packets and/or the second data packets to a monitoring entity or to a big data layer of the communication network.

\* \* \* \* \*